(12) United States Patent
Kim (10) Patent No.: US 9,344,415 B2
(45) Date of Patent: May 17, 2016

(54) AUTHENTICATION METHOD OF ACCESSING DATA NETWORK AND ELECTRONIC DEVICE THEREFOR

(71) Applicant: Samsung Electronics Co., Ltd., Gyeonggi-do (KR)

(72) Inventor: Amang Kim, Daegu (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 183 days.

(21) Appl. No.: 13/875,552

(22) Filed: May 2, 2013

(65) Prior Publication Data

US 2013/0298193 A1    Nov. 7, 2013

(30) Foreign Application Priority Data

May 2, 2012  (KR) ......................... 10-2012-0046344

(51) Int. Cl.
*H04L 29/06* (2006.01)
*H04W 12/06* (2009.01)
*H04W 88/02* (2009.01)
*H04W 88/08* (2009.01)

(52) U.S. Cl.
CPC .............. *H04L 63/08* (2013.01); *H04W 12/06* (2013.01); *H04W 88/02* (2013.01); *H04W 88/08* (2013.01)

(58) Field of Classification Search
CPC ...... H04L 63/08; H04W 12/06; H04W 88/02; H04W 88/08
See application file for complete search history.

(56) References Cited

U.S. PATENT DOCUMENTS

| 2011/0040867 A1* | 2/2011 | Kalbag ......................... 709/224 |
| 2011/0085447 A1 | 4/2011 | Kholaif et al. |
| 2011/0173682 A1* | 7/2011 | Perry et al. ........................ 726/4 |

* cited by examiner

*Primary Examiner* — Zachary A Davis
*Assistant Examiner* — Devin Almeida
(74) *Attorney, Agent, or Firm* — Cha & Reiter, LLC (57) ABSTRACT

Disclosed is an electronic device and an authentication method performing therein. The authentication method includes transmitting a first address to a service providing node, receiving a first response to the transmission of the first address from the service providing node, transmitting a second address to the service providing node, receiving a second response to the transmission of the second address from the service providing node, and determining whether it is necessary to perform authentication for accessing a data network as a result of comparing the first response with the second response.

16 Claims, 10 Drawing Sheets

AUTHENTICATION METHOD OF ACCESSING DATA NETWORK AND ELECTRONIC DEVICE THEREFOR

CLAIM OF PRIORITY

This application claims the benefit under 35 U.S.C. §119(a) of a Korean patent application filed in the Korean Intellectual Property Office on May 2, 2012 and assigned Serial No. 10-2012-0046344, the entire disclosure of which is hereby incorporated by reference.

BACKGROUND OF THE INVENTION

1. Field of the Invention

The present invention relates to an authentication method of accessing a data network and an electronic device therefor.

2. Description of the Related Art

Today's portable electronic devices such as smart phones, laptops, tablet PCs, etc. provides various multimedia services using wireless communication technologies. An electronic device may access a data network such as a wireless Local Area Network (LAN) and a cellular network and may provide various multimedia services.

When providing a data service to a user, the device accesses the data network through a service providing node. At this time, when it is necessary to perform authentication for accessing the data network, the electronic device drives a web browser and performs the authentication for accessing the data network.

As described above, when it is necessary to perform the authentication for accessing the data network, the electronic device performs the authentication for accessing the data network using the web browser. Therefore, when the electronic device senses a data network which it is necessary to perform the authentication for accessing, there is a problem in that it may not provide a data service using the data network before executing the web browser by an operation of a user and performing the authentication for accessing the data network.

Therefore, a convenient user interface for performing the authentication for accessing the data network is needed in the electronic device.

SUMMARY OF THE INVENTION

An aspect of the present invention is to solve at least the above-mentioned problems and/or disadvantages and to provide at least the advantages described below. Accordingly, an aspect of the present invention is to provide an apparatus and method for accessing a data network in an electronic device.

Another aspect of the present invention is to provide an apparatus and method for performing authentication for accessing a data network in an electronic device.

Another aspect of the present invention is to provide an apparatus and method for determining whether it is necessary to perform authentication for accessing a data network in consideration of address information provided from a service providing node in an electronic device.

In accordance with an aspect of the present invention, an authentication method of accessing a data network in an electronic device is provided. The authentication method includes transmitting a first address to a service providing node, receiving a first response to the transmission of the first address from the service providing node, transmitting a second address to the service providing node, receiving a second response to the transmission of the second address from the service providing node, and determining whether it is necessary to perform authentication for accessing a data network as a result of comparing the first response with the second response.

In accordance with another aspect of the present invention, an electronic device for performing authentication for accessing a data network is provided. The electronic device includes at least one processor, a memory, and at least one program, each of the at least one program which is stored in the memory and is configured to be executable by the at least one processor, wherein at least one program include at least one instructions for transmitting a first address to a service providing node, receiving a first response to the transmission of the first address from the service providing node, transmitting a second address to the service providing node, receiving a second response to the transmission of the second address from the service providing node, and determining whether it is necessary to perform authentication for accessing a data network as a result of comparing the first response with the second response.

In accordance with another aspect of the present invention, an electronic device for performing authentication for accessing a data network is provided. The electronic device includes a means for transmitting a first address to a service providing node, a means for receiving a first response to the transmission of the first address from the service providing node, a means for transmitting a second address to the service providing node, a means for receiving a second response to the transmission of the second address from the service providing node, and a means for determining whether it is necessary to perform authentication for accessing a data network as a result of comparing the first response with the second response.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

Exemplary embodiments of the present invention will be described herein below with reference to the accompanying drawings. In the following description, well-known functions or constructions are not described in detail since they would obscure the invention in unnecessary detail.

Hereinafter, a description will be given for a method and apparatus of performing authentication for accessing a data network in an electronic device. The electronic device may be any one of a Personal Digital Assistant (PDA), a laptop, a smart phone, a netbook, a television, a handheld computer, a Mobile Internet Device (MID), a Ultra Mobile Personal Computer (PC), a tablet PC, a navigation device, a Moving Picture Experts Group (MPEG) layer 3 (MP3) player, etc.

Herein, a service providing node may be any one of an Access Point (AP) for providing a data service to an electronic device which is positioned in a service area of the service providing node, a host AP, a group owner for providing wireless Local Area Network (LAN) connection, a base station, etc. Herein, wireless LAN Direct is a communication type in which client nodes provide a Peer to Peer (P2P) service through a wireless LAN, and is referred to as Wi-Fi Direct.

Herein, the term "address" means a network address. An address can be a private network address, or a public network address such as an Internet address. An Internet address can also be called a web address or a Uniform Resource Locator (URL). A web address is known to include a domain name as a part thereof.

Herein, "first address" and "second address" refer to different addresses.

Figure 1:
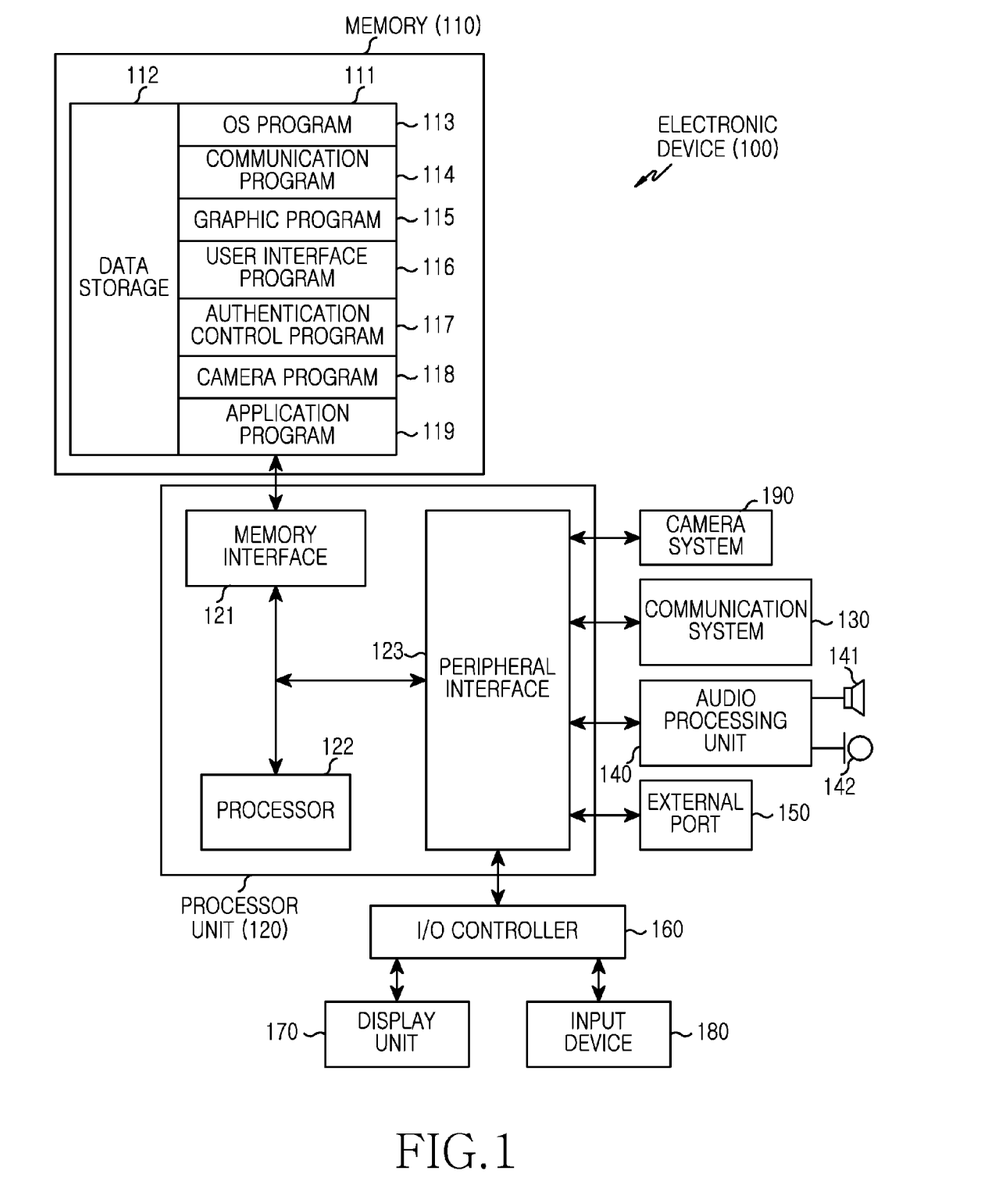
FIG. 1 is a block diagram illustrating a configuration of an electronic device according to an embodiment of the present invention

FIG. 1 is a block diagram illustrating configuration of an electronic device 100 according to an embodiment of the present invention. Device 100 includes a memory 110, a processor unit 120, a communication system 130, an audio processing unit 140, an external port 150, an Input/Output (I/O) controller 160, a display unit 170, an input device 180, and a camera system 190. Here, the memory 110, the communication system 130, and the external port 150 may be a plurality of memories, communication systems, and external ports, respectively.

A description for respective components is as follows.

The memory 110 may include a program storing unit 111 for storing a program for controlling an operation of the electronic device 100 and a data storing unit 112 for storing data items generated while the program is executed. For example, the program storing unit 111 includes an Operating System (OS) program 113, a communication program 114, a graphic program 115, a user interface program 116, an authentication control program 117, a camera program 118, and at least one application program 119. The programs included in the program storing unit 111 may be expressed in a set of instructions. Also, the programs are expressed in an instruction set.

The OS program 113 includes at least one software component for controlling a general system operation. Also, the OS program 113 performs a function for smoothly communicating between a plurality of hardware and software components.

The communication program 114 includes at least one software component for processing data items transmitted and received through the communication system 130 or the external port 150.

The graphic program 115 includes at least one software component for providing and displaying graphics on the display unit 170. For example, when authentication for accessing a data network is performed through the authentication control program 117, the graphic program 115 may include an instruction for displaying an authentication window for accessing the data network on the display unit 170.

The user interface program 116 includes at least one software component related to a user interface. For example, when authentication for accessing the data network is performed through the authentication control program 117, the user interface program 116 may include an instruction for providing a user interface for performing the authentication for accessing the data network. Accordingly, when the authentication for accessing the data network is performed through the authentication control program 117, the user interface program 116 may include an instruction for controlling the graphic program 115 to display the authentication window for accessing the data network on the display unit 170.

Figure 4:
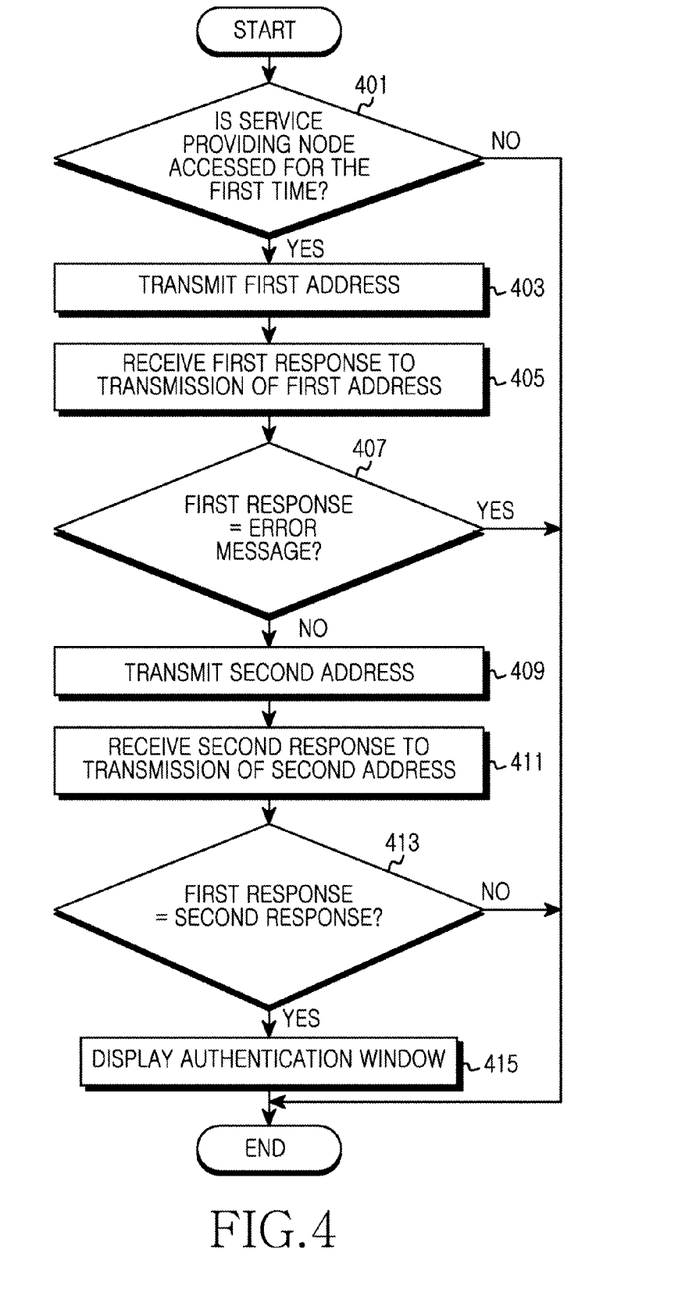
FIG. 4 is a flow chart illustrating a process of performing authentication for accessing a data network according to another embodiment of the present invention.
Figure 5:
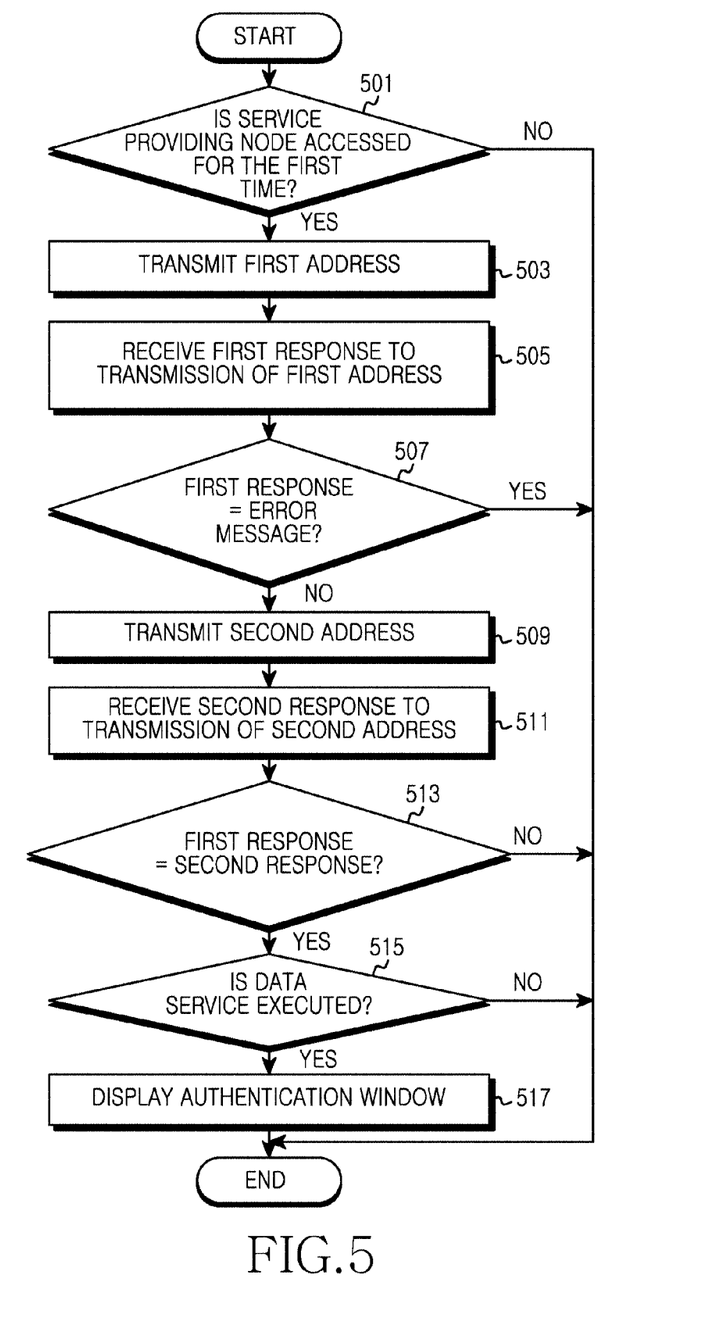
FIG. 5 is a flow chart illustrating a process of performing authentication for accessing a data network according to another embodiment of the present invention.
Figure 6:
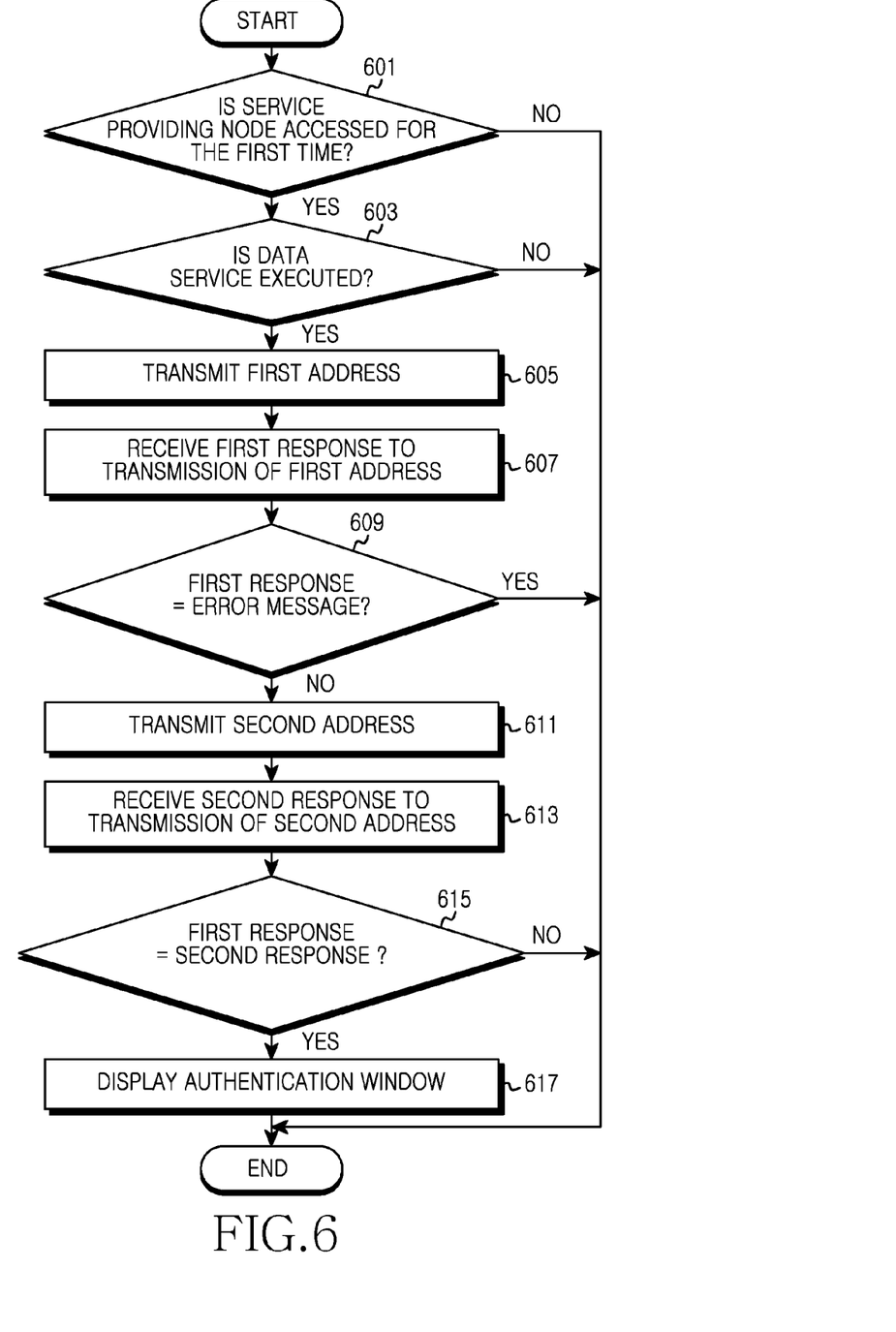
FIG. 6 is a flow chart illustrating a process of performing authentication for accessing a data network according to another embodiment of the present invention.

The authentication control program 117 includes at least one software component for performing authentication for accessing the data network through the communication system 130. For example, as shown in FIGS. 4 to 6, the authentication control program 117 includes an instruction for determining whether it is necessary to perform authentication for accessing the data network in consideration of response information provided through a service providing node. Herein, if a data service is executed, the authentication control program 117 may determine whether it is necessary to perform the authentication for accessing the data network. Also, when it is necessary to perform the authentication for accessing the data network, the authentication control program 117 includes an instruction for performing the authentication for accessing the data network. Herein, if a data service is executed, the authentication control program 117 may perform the authentication for accessing the data network.

The camera program 118 includes cameral-related software components capable of performing camera-related processes and functions.

The application program 119 includes a software component for at least one application program installed in the electronic device 100.

The processor unit 120 includes a memory interface 121, at least one processor 122, and a peripheral interface 123. Herein, the memory interface 121, at least the one processor 122, and the peripheral interface 123 which are included in the processor unit 120 may be integrated in at least one Integrated Circuit (IC) or be implemented as separate components.

The memory interface 121 controls access to the memory 110 of a component like the processor 122 or the peripheral interface 123.

The peripheral interface 123 controls connection among input and output peripherals of the electronic device 100, the processor 122, and the memory interface 121.

The processor 122 provides a variety of services like voice communication and data communication using at least one software program. Also, the processor 122 executes at least one program stored in the memory 110 and provides a service corresponding to the corresponding program. For example, the processor 122 executes the authentication control program 117 stored in the memory 100 and performs the authentication for accessing the data network.

The communication system 130 performs a communication function with a service providing node. Herein, the communication system 130 may be classified into a plurality of communication sub-modules which support different communication networks. For example, the communication network may be, but is not limited to, any one of a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless LAN, a Bluetooth network, a Near Field Communication (NFC) network, etc.

The audio processing unit 140 may connect to a speaker 141 and a microphone 142 and may be responsible for inputting and outputting an audio stream, such as a voice recognition function, a voice copy function, a digital recording function, and a phone call function.

The external port 150 includes a connection interface to connect the electronic device 100 to an external electronic device directly or connect it to another electronic device through a network. For example, the external port 150 includes a Universal Serial Bus (USB) port, a High Definition Multimedia Interface (HDMI) port, a firewire port, etc.

The I/O controller 160 provides an interface between input and output devices, such as the display device 170 and the input device 180, and the peripheral interface 123.

The display unit 170 displays state information of the electronic device 100, characters input by a user, moving pictures, still pictures, etc. according to control of the graphic program 115. When the display unit 170 is equipped with a touch screen, the display unit 170 provides touch information of the touch screen to the processor unit 120 through the I/O controller 160.

The input device 180 provides an input data generated by selection of the user to the processor unit 120 through the I/O controller 160. For one example, the input device 180 includes only a control button for controlling the electronic device 100. For another example, the input device 180 may be equipped with a keypad for receiving an input data from the user.

The camera system 190 may perform a function for photographing a moving picture data and a still picture data.

In one embodiment of the processor unit described above, the electronic device 100 includes the authentication control program 117 for performing the authentication for accessing the data network in the program storing unit 111. Herein, the processor 122 executes the authentication control program 117 stored in the program storing unit 111 and performs the authentication for accessing the data network.

Figure 2:
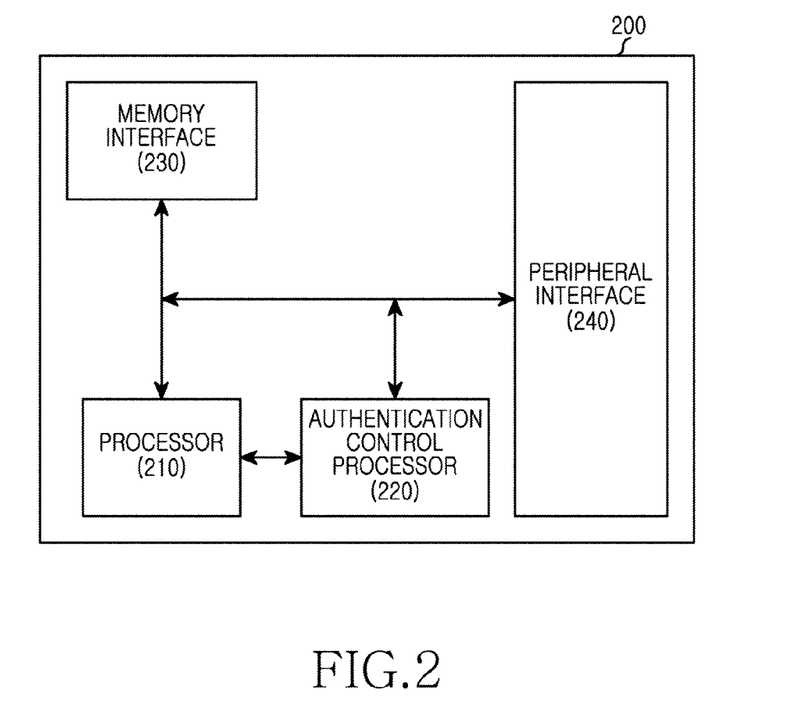
FIG. 2 is a block diagram illustrating configuration of a processor unit according to another embodiment of the present invention.

In another embodiment of the processor unit which will be described later, as shown in FIG. 2, an electronic device may include a separate authentication control processor 220 including an authentication control program. Herein, FIG. 2 illustrates another embodiment of the processor unit of the electronic device of FIG. 1.

FIG. 2 is a block diagram illustrating configuration of a processor unit according to another embodiment of the present invention.

As shown in FIG. 2, the processor unit denoted by 200 includes at least one processor 210, an authentication control processor 220, a memory interface 230, and a peripheral interface 240. Herein, at least the one processor 210, the authentication control processor 220, the memory interface 230, and the peripheral interface 240 which are included in the processor unit 200 may be integrated in at least one IC or may be implemented as separate components.

The processor 210 provides various services such as voice communication and data communication using at least one software program in an electronic device. Also, the processor 210 executes at least one program stored in a memory and provides a service corresponding to the corresponding program.

The authentication control processor 220 performs authentication for accessing a data network through a communication system. For example, as shown in FIGS. 4 to 6, the authentication control processor 220 determines whether it is necessary to perform authentication for accessing a data network in consideration of response information provided through a service providing node. Herein, if a data service is executed, the authentication control processor 220 may determine whether it is necessary to perform authentication for accessing the data network. Also, when it is necessary to perform the authentication for accessing the data network, the authentication control processor 220 performs the authentication for accessing the data network. Herein, if a data service is executed, the authentication control processor 220 may perform the authentication for accessing the data network.

The memory interface 230 controls access to the memory of a component like the processor 210 or the peripheral interface 240.

The peripheral interface 240 controls connection among an input and output peripheral device of the electronic device, the processor 210, and the memory interface 230.

Figure 3A:
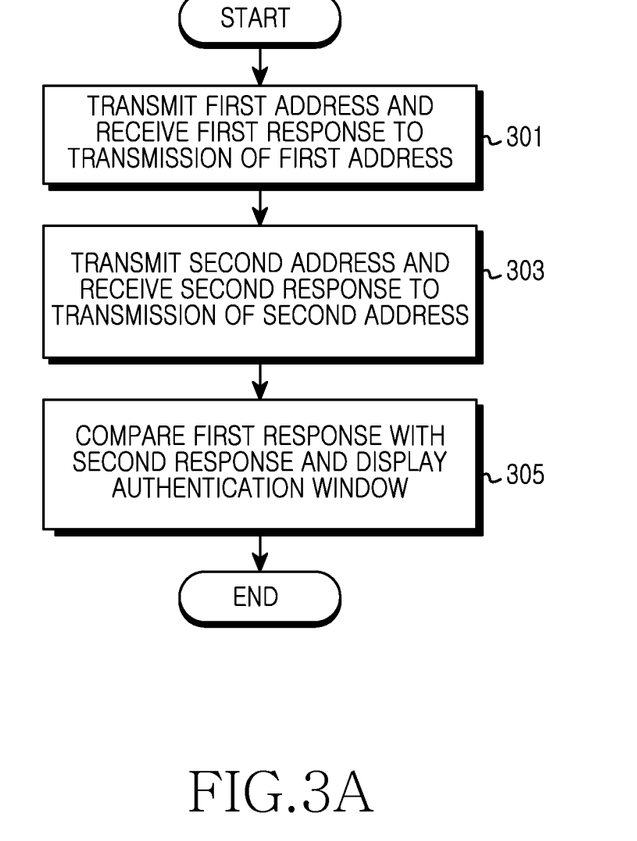
FIG. 3A is a flow chart illustrating a process of performing authentication for accessing a data network according to one embodiment of the present invention.

FIG. 3A is a flow chart illustrating a method of performing authentication for accessing a data network according to an embodiment of the present invention. The method is performed by an electronic device, e.g., electronic device 100 of FIG. 1.

The method begins at step 301, in which the device transmits a first address to a service providing node and receives a first response to the transmission of the first address from the service providing node. The first address may be predetermined and set as default by device 100, or may be set by a user.

The device transmits a second address to the service node and receives a second response thereto from the service providing node in step 303. The second address, which is different than the first address, may also be predetermined by the electronic device or set by the user.

Figure 7A:
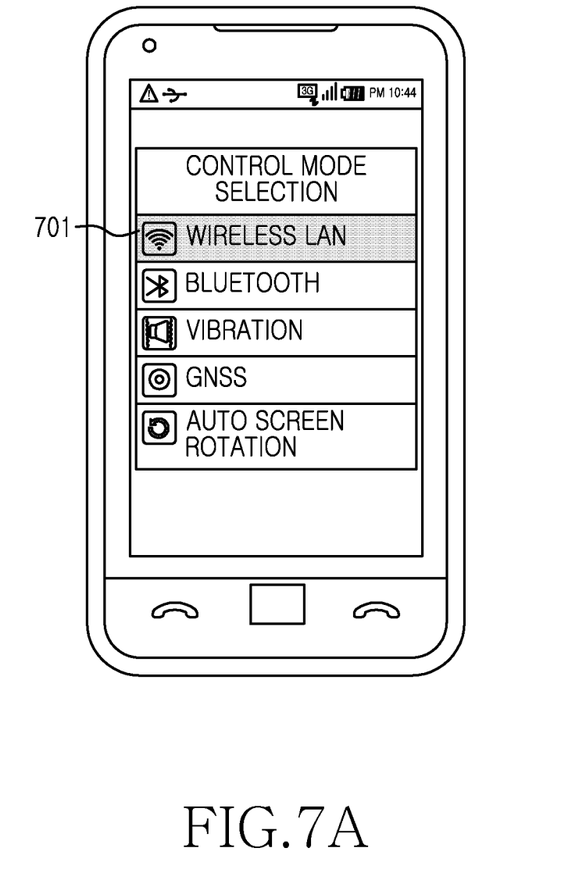
FIGS. 7A, 7B and 7C illustrate screens for performing authentication for accessing a data network according to one embodiment of the present invention.
Figure 7B:
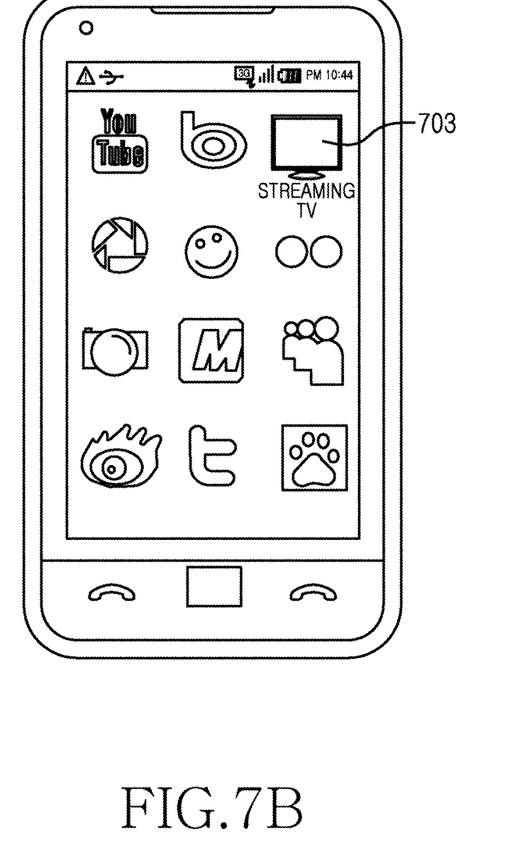
Figure 7C:
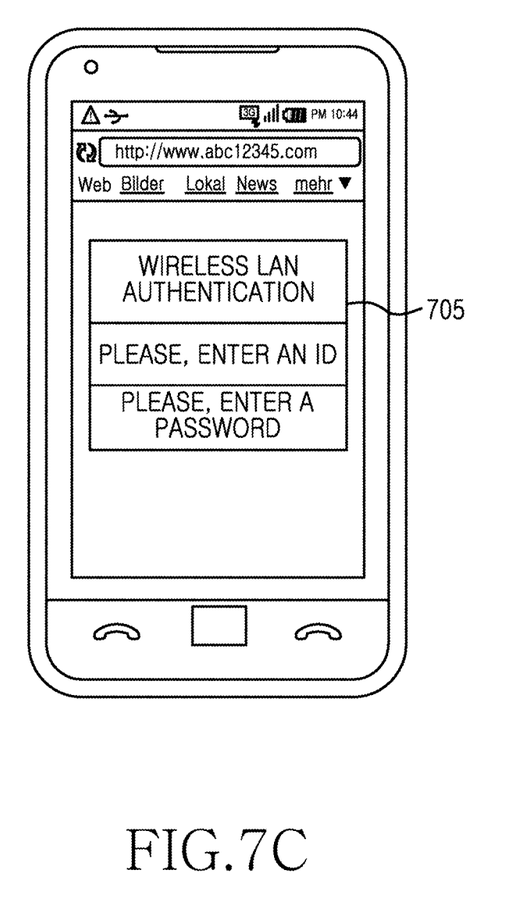

The method proceeds next to step 305 and displays an authentication window for performing authentication for accessing a data network as a result of comparing the first response according to the transmission of the first address with the second response according to the transmission of the second address. For example, when the first response according to the transmission of the first address is same to the second response according to the transmission of the second address, the electronic device recognizes that it is necessary to perform authentication for accessing a data network. Accordingly, as shown in FIG. 7C, the electronic device display an authentication window 705 capable of receiving an ID and a password and performing authentication for accessing a data network on a display unit. Herein, the authentication window 705 may be displayed using a web browser or may be displayed as a pop-up window.

As described above, when the first response according to the transmission of the first address is same to the second response according to the transmission of the second address, the electronic device recognizes that it is necessary to perform the authentication for accessing the data network. That is, when an electronic device which does not perform the authentication for accessing the data network requests the service providing node to perform the authentication for accessing the data network, the service providing node provides information for performing the authentication for accessing the data network to the electronic device.

Figure 3B:
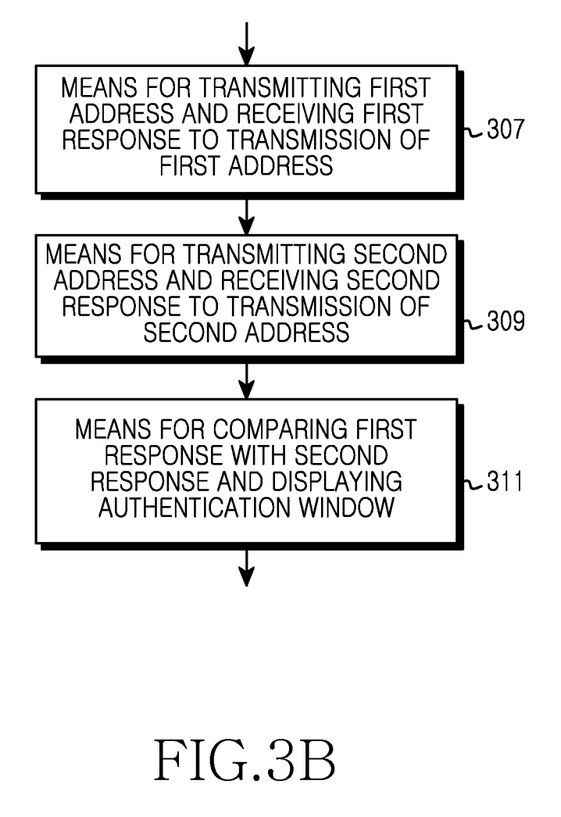
FIG. 3B is a block diagram illustrating configuration of an electronic device for performing authentication for accessing a data network according to one embodiment of the present invention.

As described above, the process of performing the authentication for accessing the data network may be performed, as shown in FIG. 3B, in an electronic device for performing the authentication for accessing the data network.

FIG. 3B is a block diagram illustrating configuration of an electronic device for performing authentication for accessing a data network according to one embodiment of the present invention.

Referring to FIG. 3B, the electronic device includes a means 307 for transmitting a first address to a service providing node and receiving a first response according to the transmission of the first address from the service providing node. The first address may be predetermined and set as default by electronic device 100, or may be set by a user.

Also, the electronic device includes a means 309 for transmitting a second address to the service providing node and receiving a second response according to the transmission of the second address from the service providing node. The second address, which is different than the first address, may also be predetermined by the electronic device or set by the user.

Also, the electronic device includes a means 311 for displaying an authentication window for performing authentication for accessing a data network as a result of comparing the first response according to the transmission of the first address with the second response according to the transmission of the second address. For example, when the first response according to the transmission of the first address is same to the second response according to the transmission of the second address, the electronic device recognizes that it is necessary to perform authentication for accessing a data network. Accordingly, as shown in FIG. 7C, the electronic device displays an authentication window 705 capable of receiving an ID and a password and performing authentication for accessing a data network on a display unit. Herein, the authentication window may be displayed using a web browser or may be displayed as a pop-up window.

As described above, in one embodiment of FIG. 3B, the electronic device includes a plurality of means for performing the process of performing the authentication for accessing the data network. In another embodiment, an electronic device may include one means for performing the above-described authentication for accessing the data network.

FIG. 4 is a flow chart illustrating a process of performing authentication for accessing a data network according to another embodiment of the present invention. An electronic device (e.g., device 100 or 100') determines that it accesses a service providing node (e.g., an AP) for the first time in step 401. For example, as shown in FIG. 7A, when a wireless LAN 701 is selected by an operation of a user, the electronic device activates the wireless LAN communication system (application) therein. The electronic device determines whether there are accessible APs using the activated wireless LAN system. When an AP is accessible, i.e., if signal strength of a detected AP is adequate, electronic device attempts to access the AP using the wireless LAN system. At this time, the electronic device determines whether it attempts access to the particular AP for the first time.

When the electronic device accesses the service providing node for the first time, it proceeds to step 403 and transmits a first address to the service providing node. Herein, the first address may be predetermined and set as default by electronic device or may be set by the user.

The method next proceeds to step 405, where the electronic device receives a first response to the transmission of the first address, from the service providing node.

The electronic device proceeds to step 407 and determines whether the first response is an error message. If so, the electronic device recognizes that it may not be verified whether it is necessary to perform authentication for accessing a data network. Accordingly, the electronic device ends the algorithm of FIG. 4.

On the other hand, when the first response is not the error message, the electronic device proceeds to step 409 and transmits a second address to the service providing node. Herein, the second address, which is different than the first address, may be predetermined and set as default by electronic device or may be set by a user.

The electronic device proceeds to step 411 and receives a second response to the transmission of the second address from the service providing node.

The electronic device proceeds to step 413 and determines a result of comparing the first response with the second response. If the first response differs from the second response, the electronic device recognizes that it is unnecessary to perform the authentication for accessing the data network. Accordingly, the electronic device ends the algorithm of FIG. 4.

On the other hand, if the first response is same to the second response, the electronic device recognizes that it is necessary to perform the authentication for accessing the data network. Accordingly, the electronic device proceeds to step 415 and displays an authentication window. For example, as shown in FIG. 7C, the electronic device displays an authentication window 705 capable of receiving an ID and a password and performing authentication for accessing the data network on a display unit. Herein, the authentication window may be displayed using a web browser or may be displayed as a pop-up window.

As described above, the electronic device verifies whether it is necessary to perform the authentication for accessing the data network through the service providing node. When it is necessary to perform the authentication for accessing the data network, the electronic device, as shown in FIG. 5, may perform authentication for accessing the data network only when executing a data service.

FIG. 5 is a flow chart illustrating a process of performing authentication for accessing a data network according to another embodiment of the present invention.

An electronic device (e.g., electronic device 100 or 100') determines that it accesses a service providing node (e.g., an AP) for the first time in step 501. For example, as shown in FIG. 7A, when a wireless LAN 701 is selected by an operation of a user, the electronic device activates the wireless LAN communication system (application) therein. The electronic device determines whether there are accessible APs using the activated wireless LAN system. When an AP is accessible, i.e., if signal strength of a detected AP is adequate, the electronic device attempts to accesses the AP using the wireless LAN system. At this time, the electronic device determines whether it attempts access to the particular AP for the first time.

When the electronic device accesses the service providing node for the first time, the method next proceeds to step 503 and transmits a first address to the service providing node. Herein, the first address may be predetermined and set as default by electronic device or may be set by the user.

The method next proceeds to step 505 where the electronic device receives a first response to the transmission of the first address from the service providing node.

The electronic device proceeds to step 507 and determines whether the first response is an error message. If so, the electronic device recognizes that it may not be determined whether it is necessary to perform authentication for accessing a data network. Accordingly, the electronic device ends the algorithm of FIG. 5.

On the other hand, if the first response is not the error message, the electronic device proceeds to the step 509 and transmits a second address to the service providing node. Herein, the second address which is different than the first address, may be predetermined and set as default by electronic device or may be set by the user.

The electronic device proceeds to step 511 and receives a second response to the transmission of the second address from the service providing node.

The electronic device proceeds to step 513 and determines a result of comparing the first response with the second response. If the first response differs from the second response, the electronic device recognizes that it is unnecessary to perform authentication for accessing the data network. Accordingly, the electronic device ends the algorithm of FIG. 5.

On the other hand, if the first response is same to the second response, the electronic device recognizes that it is necessary to perform the authentication for accessing the data network. Accordingly, the electronic device proceeds to step 515 and verifies whether a data service is executed.

If the data service is not executed, the electronic device ends the algorithm of FIG. 5.

On the other hand, if the data service is executed, the electronic device proceeds to step 517 and displays an authentication window. For example, as shown in FIGS. 7B and 7C, when a streaming TV 703 using the data network is provided, the electronic device displays an authentication window 705 capable of receiving an ID and a password and performing the authentication for accessing the data network on a display unit. Herein, the authentication window may be displayed using a web browser or may be displayed as a pop-up window.

Thereafter, the electronic device ends the algorithm of FIG. 5.

In embodiments described above, the electronic device accesses the service providing node and determines whether it is necessary to perform the authentication for accessing the special data service.

In another embodiment, an electronic device may determine whether it is necessary to perform authentication for accessing a data network only when it is determined that a data service is executed.

FIG. 6 is a flow chart illustrating a process of performing authentication for accessing a data network according to another embodiment of the present invention.

An electronic device (e.g., electronic device 100 or 100') determines that it accesses a service providing node (e.g., an AP) for the first time in step 601. For example, as shown in FIG. 7A, when a wireless LAN 701 is selected by an operation of a user, the electronic device activates the wireless LAN communication system (application) therein. The electronic device determines whether there are accessible APs using the activated wireless LAN system. When an AP is accessible, i.e., if signal strength of a detected AP is adequate, the electronic device attempts to accesses the AP using the wireless LAN system. At this time, the electronic device determines whether it attempts access to the particular AP for the first time.

When the electronic device accesses the service providing node for the first time, the method next proceeds to step 603 and verifies whether a data service is executed. For example, as shown in FIGS. 7B and 7C, the electronic device verifies whether a streaming TV 703 using a data network is executed.

If the data service is not executed, the electronic device ends the algorithm of FIG. 6.

On the other hand, if the data service is executed, the electronic device proceeds to step 605 and transmits a first address to the service providing node. Herein, the first address may be predetermined and st as default by electronic device or may be set by the user.

The method next proceeds to step 607 where the electronic device receives a first response to the transmission of the first address from the service providing node.

The electronic device proceeds to step 609 and determines whether the first response is an error message. If so, the electronic device recognizes this and ends the algorithm of FIG. 6.

On the other hand, if the first response is not the error message, the electronic device proceeds to the step 611 and transmits a second address to the service providing node. Herein, the second address which is different than the first address, may be predetermined and set as default by electronic device or may be set by the user.

The electronic device proceeds to step 613 and receives a second response to the transmission of the second address from the service providing node.

The electronic device proceeds to step 615 and determines a result of comparing the first response with the second response. If the first response differs from the second response, the electronic device recognizes that it is unnecessary to perform authentication for accessing the data network. Accordingly, the electronic device ends the algorithm of FIG. 6.

On the other hand, if the first response is same to the second response, the electronic device recognizes that it is necessary to perform the authentication for accessing the data network. Accordingly, the electronic device proceeds to step 617 and displays an authentication window. For example, the electronic device, as shown in FIG. 7C, displays an authentication window 705 capable of receiving an ID and a password and performing the authentication for accessing the data network on a display unit. Herein, the authentication window may be displayed using a web browser or may be displayed as a pop-up window.

Thereafter, the electronic device ends the algorithm of FIG. 6.

In embodiments described above, when the electronic device accesses the service providing node for the first time, it performs the authentication for accessing the data network.

In another embodiment, an electronic device may perform authentication for accessing a data network whenever it accesses a service providing node.

It will be appreciated that embodiments of the present invention according to the claims and description in the specification can be realized in the form of hardware, software or a combination of hardware and software.

Any such software may be stored in a non-transient computer readable storage medium. The computer readable storage medium stores one or more programs (software modules). The one or more programs comprising instructions which, when executed by one or more processors, cause the electronic device to perform a method of the present invention.

As such software may be stored in the form of volatile or non-volatile storage such as, for example, a storage device like a ROM, whether erasable or rewritten or not, or in the form of memory such as, for example, RAM, memory chips, device or integrated circuits or on an optically or magnetically readable memory such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As described above, the electronic device may determine whether it is necessary to perform the authentication for accessing the data network which provides a data service and may perform the authentication for accessing the data network conveniently.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An authentication method in an electronic device, comprising:
   transmitting a first address to a service providing node;
   receiving a first response to the transmission of the first address from the service providing node;
   transmitting a second address to the service providing node;
   receiving a second response to the transmission of the second address from the service providing node;
   comparing the first response with the second response; and
   performing an authentication for accessing a data network when the first response matches the second response,
   wherein the first address and the second address are different web page addresses.

2. The authentication method of claim 1, wherein performing the authentication for accessing a data network comprises:
   displaying an authentication window for performing the authentication for accessing the data network when the first response matches the second response; and
   performing authentication for accessing a data network through the displayed authentication window.

3. The authentication method of claim 2, wherein displaying of the authentication window comprises:
   determining whether a data service is executed; and
   displaying the authentication window when the data service is executed.

4. The authentication method of claim 2, wherein the authentication window is displayed using a web browser or is displayed as a pop-up window.

5. The authentication method of claim 1, further comprising determining whether a data service is executed,
   wherein the first address is transmitted to the service providing node when the data service is executed.

6. The authentication method of claim 1, wherein the service providing node includes a node for providing a data service to at least one electronic device which is positioned in a service area of the service providing node.

7. The authentication method of claim 1, wherein the service providing node includes at least one of an access point (AP), a host AP, a group owner for providing a point to point (P2P) service, and a base station.

8. The authentication method of claim 1, wherein the first and second addresses are different web page addresses, respectively and each of the first and second addresses includes at least one of a domain name, an IP address, and a URL.

9. An electronic device comprising:
   a communication system;
   a display;
   a memory; and
   at least one processor configured to:
     transmit a first address to a service providing node through the communication system,
     receive a first response to the transmission of the first address from the service providing node through the communication system,
     transmit a second address to the service providing node through the communication system,
     receive a second response to the transmission of the second address from the service providing node through the communication system,
     comparing the first response with the second response, and
     perform authentication for accessing a data network when the first response matches the second response,
   wherein the first address and the second address are different web page addresses.

10. The electronic device of claim 9, wherein the display is configured to display an authentication window for performing the authentication for accessing the data network when the first response matches the second response.

11. The electronic device of claim 10, wherein the processor is configured to determine whether a data service is executed, and control the display to display the authentication window when a data service is executed.

12. The electronic device of claim 10, wherein the authentication window is displayed using a web browser or is displayed as a pop-up window.

13. The electronic device of claim 9, wherein processor is configured to determine whether a data service is executed, and transmit the first address to the service providing node through the communication system when the data service is executed.

14. The electronic device of claim 9, wherein the service providing node includes a node for providing a data service to at least one electronic device which is positioned in a service area of the service providing node.

15. The electronic device of claim 9, wherein the service providing node includes at least one of an access point (AP), a host AP, a group owner for providing a point to point (P2P) service, and a base station.

16. The electronic device of claim 9, wherein the first and second addresses are different web page addresses, respectively and each of the first and second addresses includes at least one of a domain name, an IP address, and a URL.

* * * * *